US008068852B2

(12) United States Patent
Cho et al.

(10) Patent No.: US 8,068,852 B2
(45) Date of Patent: Nov. 29, 2011

(54) METHOD AND SYSTEM FOR DETECTING POSITION OF MOBILE COMMUNICATION TERMINAL BY USING PILOT STRENGTH MEASUREMENT MESSAGE

(75) Inventors: Chaehwan Cho, Seoul (KR); Gyuyoung Han, Anyang-si (KR); Namgyu Kim, Suwon-si (KR); Jungbae Moon, Yongin-si (KR); Hojin Yang, Bucheon-si (KR)

(73) Assignee: SK Telecom Co., Ltd. (KR)

( * ) Notice: Subject to any disclaimer, the term of this patent is extended or adjusted under 35 U.S.C. 154(b) by 436 days.

(21) Appl. No.: 12/296,685

(22) PCT Filed: Apr. 18, 2007

(86) PCT No.: PCT/KR2007/001885
§ 371 (c)(1),
(2), (4) Date: Oct. 10, 2008

(87) PCT Pub. No.: WO2007/120013
PCT Pub. Date: Oct. 25, 2007

(65) Prior Publication Data
US 2009/0274116 A1 Nov. 5, 2009

(30) Foreign Application Priority Data
Apr. 19, 2006 (KR) .................. 10-2006-0035233

(51) Int. Cl.
*H04W 24/00* (2009.01)
(52) U.S. Cl. ............... 455/456.1; 455/404.2; 455/440; 370/331; 370/332; 370/335

(58) Field of Classification Search ............... 455/456.1, 455/404.2, 433, 435.1, 440, 456.2, 456.3, 455/456.5, 456.6, 432.1; 370/331
See application file for complete search history.

(56) References Cited

U.S. PATENT DOCUMENTS

| | | | | |
|---|---|---|---|---|
| 6,654,609 | B2 * | 11/2003 | Kim | 455/437 |
| 6,658,258 | B1 * | 12/2003 | Chen et al. | 455/456.1 |
| 6,990,341 | B2 * | 1/2006 | Kang et al. | 455/434 |
| 7,065,351 | B2 * | 6/2006 | Carter et al. | 455/423 |
| 2001/0027114 | A1 | 10/2001 | Kim | |
| 2001/0041570 | A1 | 11/2001 | Kim | |
| 2003/0157943 | A1 | 8/2003 | Sabat, Jr. | |
| 2004/0121774 | A1 * | 6/2004 | Rajkotia et al. | 455/441 |
| 2007/0229355 | A1 * | 10/2007 | Han et al. | 342/419 |
| 2007/0270157 | A1 * | 11/2007 | Kim et al. | 455/456.1 |
| 2009/0073031 | A1 * | 3/2009 | Kim | 342/357.1 |
| 2009/0125220 | A1 * | 5/2009 | Kim et al. | 701/119 |

FOREIGN PATENT DOCUMENTS

| | | |
|---|---|---|
| KR | 10-2005-0092943 | 11/2006 |
| WO | WO 2005/088336 | 9/2005 |

\* cited by examiner

*Primary Examiner* — Anthony Addy
*Assistant Examiner* — Kenneth Corbin
(74) *Attorney, Agent, or Firm* — Baker Hostetler LLP

(57) ABSTRACT

There is provided a system for detecting a location of a mobile station (MS) by using a pilot strength measurement message (PSMM) in a mobile communication system providing a location-based service in a mobile communication network, comprising: a position determination entity (PDE) for detecting the location of the mobile station, collecting PSMM information from the mobile station, the location detection of which is required, and obtaining the location of the mobile station by using collected PSMM information.

9 Claims, 2 Drawing Sheets ered in that it is a service capable of providing
METHOD AND SYSTEM FOR DETECTING POSITION OF MOBILE COMMUNICATION TERMINAL BY USING PILOT STRENGTH MEASUREMENT MESSAGE This non-provisional application claims priorities under 35 U.S.C. §119 (a) on patent Application No. 10-2006-0035233 filed in Korea on Apr. 19, 2006, the entire contents of which are hereby incorporated by reference.

TECHNICAL FIELD

The present invention relates to a method and system for detecting a position of a mobile station by using a Pilot Strength Measurement Message (PSMM), and more particularly to a method and system by which a Position determination entity detects the position of a mobile station by using a PSMM, which is used for handover in a CDMA mobile communication system, so as to increase the accuracy of position detection of the mobile station, in a mobile communication system which provides a location-based service to the mobile station not equipped with a Global Positioning System (GPS) function.

BACKGROUND ART

With the rapid development of computers, electronics and communication technologies, various wireless communication services using a wireless network have been provided. Accordingly, services provided by a mobile communication system using a wireless network are being developed into a multimedia communication service capable of transmitting data, such as circuit data and packet data, as well as voice.

With the recent development of information communication, International Mobile Telecommunication 2000 (IMT-2000) has been commercialized, which corresponds to the $3^{rd}$ mobile communication system and has been established as a standard by the International Telecommunication Union Recommendation (ITU-R). The IMT-2000 includes a Code Division Multiple Access (CDMA) 2000 1X, 3X and Evolution Data Only (EV-DO), a wideband CDMA (wideband CDMA), etc., which can provide a wireless communication service by means of an IS-95C network evolved from the existing IS-95A network and IS-95B network.

In particular, the IMT-2000 is a mobile communication system which has been developed to implement worldwide direct roaming including personal mobility and service mobility, communication quality having the same level as that of a landline telephone, a high-speed packet data service, and various application services through the combination of a wired/wireless network. Such an IMT-2000 can provide various multimedia services, e.g., Audio On Demand (AOD), Video On Demand (VOD), etc., at higher speeds, as well as improving the quality of an existing voice and Wireless Application Protocol (WAP) service.

With the establishment of the Internet based on a Transmission Control Protocol/Internet Protocol (TCP/IP), systems enabling the user to search for various kinds of information and to transmit various data including characters, voice, images and moving pictures, in real time by means of the Internet are rapidly developed. Further, with such development, ultra-high-speed communication networks and so on are increasingly being introduced so as to enable users to use various communication services using the Internet in better environments.

Also, in order to provide a communication service without any spatial restriction, a wireless Internet service providing mobile communication subscribers with an Internet communication service through a wireless communication network has recently been proposed, and a large number of enterprises are progressing to develop a technique called wireless Internet. A wireless Internet service is an advanced personalization service based on the use of a terminal by an individual, and is characterized in that it is a service capable of providing specific information based on the user mobility. Mobile communication service subscribers may receive various kinds of information, such as news, weather, sports, stock, monetary circulation, exchange rates and traffic reports, through characters, voice, still images, moving images, etc.

Among various wireless Internet services using mobile stations, Location-Based Services (LBS) is in the spotlight due to its wide availability and convenience. The LBS represents a communication service for determining the location of a mobile station, such as a cellular phone or a Personal Digital Assistant (PDA), and providing supplementary information relating to the determined location. The LBS may be applied to various fields and situations, such as a rescue request, countermeasure for reporting of a crime, a Geographical Information System (GIS) for providing adjacent region information, traffic information, vehicle navigation and material flow control, and a location-based Customer Relationship Management (CRM).

In order to determine the location of a mobile station, the LBS has used either a method of understanding the location of a mobile station based on a Global Positioning System (GPS) and then detecting the location of the mobile station by means of navigation data which are measurement values of the GPS, or a method of understanding the location of a mobile station based on a base station or network. Meanwhile, a server for providing the LBS receives location information, which has been measured by a mobile station, via a mobile communication network including a Mobile Switching Center, and provides services based on the location of the corresponding user.

Meanwhile, only about 25% of mobile communication subscribers use a GPS-based location detecting method through mobile stations equipped with a GPS function, while the other mobile communication subscribers receive an LBS by using a Cell ID scheme based on a base station, which has a low accuracy in location detection. The Cell ID scheme causes an error up to a maximum of several kilometers, which acts as an obstacle in activation of the LBS.

Therefore, there is a need for providing a method of improving the accuracy of location detection for a mobile station not equipped with a GPS function, and a location-based service using such a method.

DISCLOSURE OF THE INVENTION

Therefore, the present invention has been made in view of the above-mentioned problems, and the present invention provides a method and system for detecting the position of a mobile station by a Position determination entity using a PSMM, which is used for handover in a CDMA mobile communication system, so as to increase the accuracy of position detection of the mobile station, in a mobile communication system which provides a location-based service to the mobile station not equipped with a Global Positioning System (GPS) function.

In accordance with an aspect of the present invention, there is provided a system for detecting a location of a mobile station (MS) by using a pilot strength measurement message (PSMM) in a mobile communication system providing a location-based service in a mobile communication network, which includes: the mobile station to be provided with the location-based service using wireless communication; a Radio Access Network (RAN) including a base station transceiver and a base station controller, receiving and processing a wireless communication request of the mobile station, and performing hand off and a wireless support and management function; and a Mobile Switching Center (MSC) for performing basic and supplementary services for the mobile station, processing terminating and originating calls of a subscriber, processing location registration and handoff procedures, and performing an inter-working function with another network, the system including: a position determination entity (PDE) corresponding to a server for detecting the location of the mobile station, collecting PSMM information from the mobile station, the location detection of which is required, and detecting the location of the mobile station by using the collected PSMM information.

In accordance with another aspect of the present invention, there is provided a method for detecting a location of a mobile station (MS) by using a pilot strength measurement message (PSMM) in a location-based service system, which includes: the mobile station to be provided with the location-based service using wireless communication; a Radio Access Network (RAN) including a base station transceiver and a base station controller, receiving and processing a wireless communication request of the mobile station, and performing hand off and a wireless support and management function; a Mobile Switching Center (MSC) for performing basic and supplementary services for the mobile station, processing terminating and originating calls of a subscriber, processing location registration and handoff procedures, and performing an inter-working function with another network; and a position determination entity (PDE) corresponding to a server for detecting the location of the mobile station, collecting PSMM information from the mobile station, the location detection of which is required, and detecting the location of the mobile station by using the collected PSMM information, the method including the steps of: (a) transmitting, by the position determination entity, an ISPOS request (Inter_System_Position_Request) message to the Mobile Switching Center; (b) transmitting, by the Mobile Switching Center, an RMP request (Radio_Measurement_for_Position_Request) message to the base station controller; (c) receiving, by the base station controller, the RMP request message from the Mobile switching Center, and determining the P_Rev (Protocol Revision) corresponding to the version of the specification standard for mobile communication such as CDMA or WCDMA of the mobile station; (d) transmitting a PPMRO (Periodic_Pilot_Measurement_Request_Order) message to the mobile station when the P_Rev has a value equal to or greater than 6 at step (c), and transmitting a PMRO (Pilot_Measurement_Request_Order) message to the mobile station when the P_Rev has a value equal to or less than 5 at step (c); (e) collecting, by the base station controller, the PSMM information from the mobile station by using the PPMRO message or the PMRO message; (f) transmitting, by the base station controller, an RMP response (Radio_Measurements_for_Position_Response) message including the PSMM information to the Mobile Switching Center; (g) transmitting, by the Mobile Switching Center, the PSMM information to the position determination entity through an ISPOS request (Inter_System_Position_Request) message; and (h) detecting, by the position determination entity, the location of the mobile station by using the collected PSMM information, and then providing the location-based service to the mobile station.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
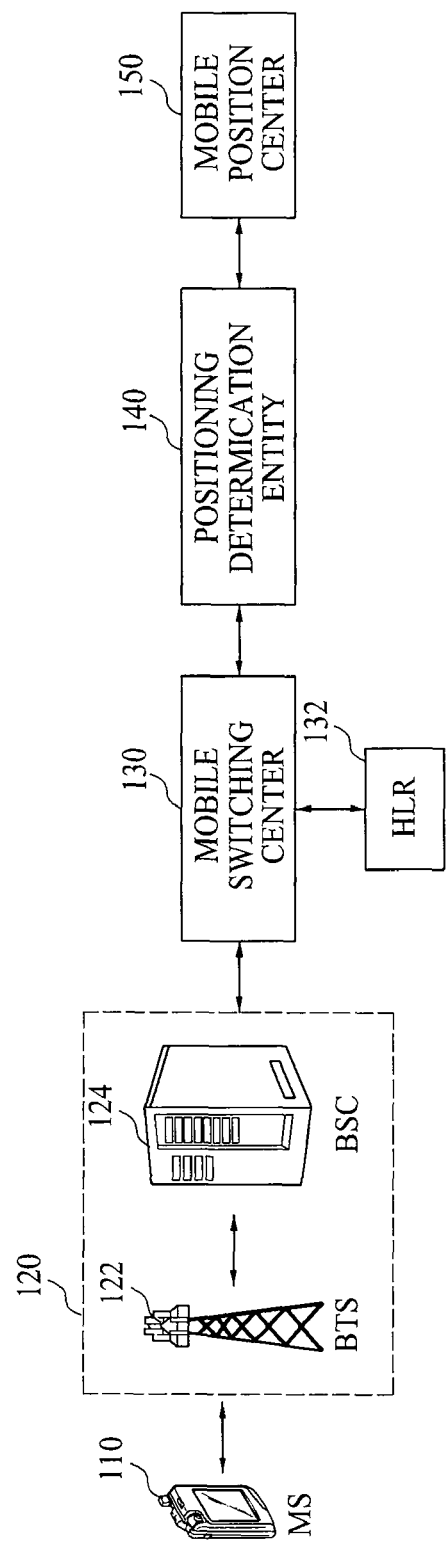
FIG. 1 is a block diagram schematically illustrating the configuration of a location-based service system according to an exemplary embodiment of the present invention.

Hereinafter, one exemplary embodiment of according to the present invention will be described with reference to the accompanying drawings. It is to be noted that the same elements are indicated with the same reference numerals throughout the drawings. In the following description of the embodiment of the present invention, a detailed description of known functions and configurations incorporated herein will be omitted when it may obscure the subject matter of the present invention.

FIG. 1 is a block diagram schematically illustrating the configuration of a location-based service system according to an exemplary embodiment of the present invention.

A mobile communication system according to an exemplary embodiment of the present invention includes a mobile station (MS) 110, a Radio Access Network (RAN) 120, a Mobile Switching Center (MSC) 130, a Home Location Register (HLR) 132, a Position determination entity (HLR) 140, a Mobile Position Center (MPC) 150.

The mobile station 110 represents a terminal for providing the user with a location-based service using wireless communication as well as performing voice communication. In addition, the mobile station 110 is not equipped with a Global Positioning System (GPS), and uses a base-station-based or network-based location detecting method in order to provide a location-based service to the user.

The mobile station 110 according to an exemplary embodiment of the present invention may be a Personal Digital Assistant (PDA), a cellular phone, a Personal Communication Service (PCS) phone, a handheld PC, a Global System for Mobile (GSM) phone, a Wideband CDMA (WCDMA) phone, a CDMA-2000 phone, or a Mobile Broadband System (MBS) phone, which is expected to be used in the $4^{th}$ generation system currently under discussion.

The Radio Access Network 120 receives and processes a wireless communication request of the mobile station 110, and performs a handoff, a wireless support and management function, etc. The Radio Access Network 120 includes a base station transceiver 122 and a base station controller 124, and supports both a synchronous scheme and an asynchronous scheme. In the case of the synchronous scheme, the base station transceiver 122 may correspond to a Base Transceiver Station (BTS) and the base station controller 124 corresponds to a Base Station Controller (BSC). In the case of the asynchronous scheme, the base station transceiver 122 may correspond to a Radio Transceiver Subsystem (RTS) and the base station controller 124 corresponds to a Radio Network Controller (RNC). The Radio Access Network 120 according to an exemplary embodiment of the present invention is not limited to such a configuration, and may include a GSM network and an access network for a 4G mobile communication system which will be implemented in the future, as well as a CDMA network.

The base station transceiver 122 receives a communication request signal from the mobile station 110 through a traffic channel among signal channels, and transmits the received communication request signal to the base station controller 124. In addition, the base station transceiver 122 corresponds to a network end point which is directly connected to the mobile station 110 by performing a baseband signal processing, wire/wireless conversion, transmission/reception of wireless signals, etc.

The base station controller 124 controls the base station transceiver 122, and performs a wireless channel assignment/release function for the mobile station 110, a transmission power control function of the mobile station 110 and the base station transceiver 122, a determination function of soft handoff and hard handoff between cells, a trans-coding and vocoding function, a GPS clock distribution function, and a management and maintenance function for the base station. The base station controller 124 transmits a communication request signal, which has been received through the base station transceiver 122, to the Mobile Switching Center 130.

The Mobile Switching Center 130 performs a basic and supplementary service processing function, a function for processing terminating and originating calls of a subscriber, a location registration procedure and handoff procedure processing function, an inter-working function with another network, etc. In an Interim Standard (IS)-95 A/B/C system, the Mobile Switching Center 130 includes an Access Switching Subsystem (ASS) for performing a distributed call processing function, an Interconnection Network Subsystem (INS) for performing a centralized call processing function, a Central Control Subsystem (CCS) for performing a centralization function of operation and preservation, and a Location Registration Subsystem (LRS) for performing a storage and management function of information for mobile communication subscribers, etc.

Further, the Mobile Switching Center 130 for the third or fourth generation may include an Asynchronous Transfer Mode (ATM) switch (not shown), which improves the transmission speed and the efficiency of a circuit use by transmitting packets cell by cell. In addition, the ATM switch includes subsystems which contain a mobility control subsystem for performing a subscriber registration/update function for wireless communication of the mobile station 110 and performing an interface function with the base station controller 124, a call control subsystem for performing a cell processing cell by cell, a service control subsystem for a charging function for subscribers of various supplementary services, and an intelligent peripheral subsystem for providing various supplementary services.

The Home Location Register 132 receives location information of the mobile station 110 from a visitor location register (VLR) (not shown) installed generally within the Mobile Switching Center 130, and performs registration recognition, registration deletion, and location confirmation functions. In addition, the Home Location Register 132 stores profile information of the mobile station 110. Herein, the profile information represents the mobile identification number (MIN) of the mobile station 110, the electronic serial number (ESN) thereof, information regarding mobile communication services which the mobile station 110 has joined, etc.

The Position determination entity 140 corresponds to a server for detecting the location of the mobile station 110 in order to provide the location-based service. The Position determination entity 140 requests the mobile station 110, the location detection of which is required, for as many pilot strength measurement messages (PSMMs) as necessary in desired conditions, through the Mobile Switching Center 130, and the base station controller 124 transmits information about a pilot signal, which has been collected by the mobile station 110 under the conditions desired by the Position determination entity 140, to the Position determination entity 140 through the Mobile Switching Center 130.

In order to detect the location of the mobile station 110 not equipped with a GPS function, the Position determination entity 140 according to an exemplary embodiment of the present invention utilizes a PSMM which is used upon a handover in a CDMA mobile communication system, and detects the location of the mobile station 110 by means of a sum of received signal strengths of all multi-path components.

The Mobile Position Center 150 acquires longitude and latitude coordinates of the mobile station 110, which have been operated by the Position determination entity 140, in cooperation with the Position determination entity 140, and transmits the longitude and latitude coordinates to various LBS platforms to provide location-based services.

The LBS platform functions to provide a fundamental technology required between a mobile communication network and an LBS application server. That is, the LBS platform performs a function for accessing a network and a location data processing function for processing a large amount of location information in real time, and also provides a location information service, a user information service, and network management.

Figure 2:
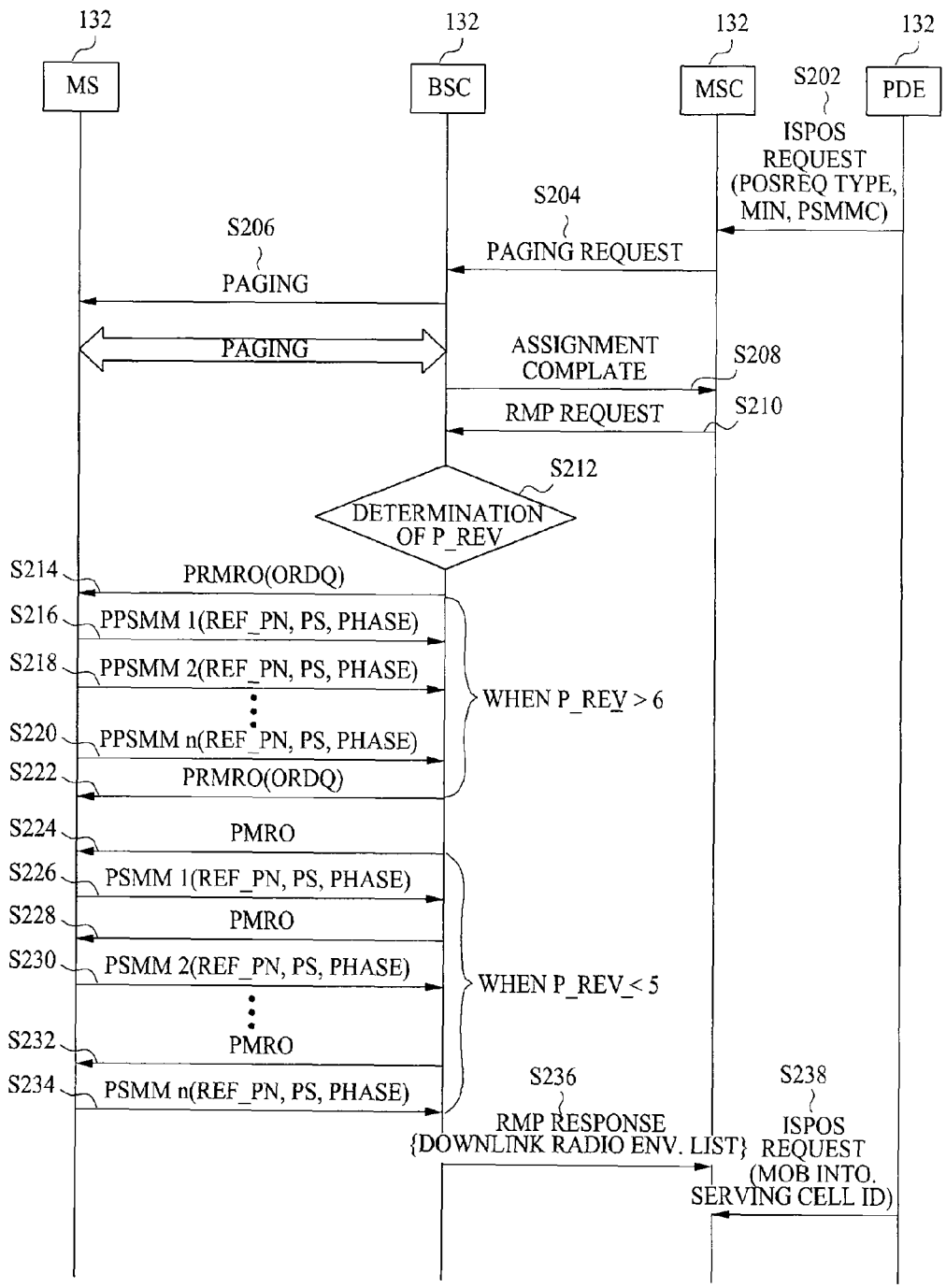
FIG. 2 is a flowchart illustrating a method for detecting the location of a mobile station by using a PSMM according to an exemplary embodiment of the present invention.

FIG. 2 is a flowchart illustrating a method for detecting the location of a mobile station by using a PSMM according to an exemplary embodiment of the present invention.

According to an exemplary embodiment of the present invention, when the mobile station 110 requests a location-based service, the Position determination entity 140 requests the mobile station 110 for a PSMM to the Position determination entity 140 in order to detect the location of the mobile station 110.

In order to request a PSMM to the mobile station 110, the Position determination entity 140 transmits an ISPOS request (Inter_System_Position_Request) message to the Mobile Switching Center 130 (step 202). The ISPOS request message corresponds to a message to request a PSMM to the mobile station 110, and includes a PSMM count value.

Herein, the request of the PSMM of the mobile station 110 is available only when the mobile station 110 is in a traffic state. Therefore, if the mobile station 110 is in an idle state, the Mobile Switching Center 130 transmits a paging request (Paging_Request) message to the base station controller 124 (step 204) so that a process of establishing a traffic channel for the mobile station 110 can be performed.

When the mobile station 110 has received a paging request message from the base station controller 124 and has performed traffic establishment (step 206) or when the mobile station 110 already is in a traffic state, the base station controller 124 transmits an assignment completion (Assignment_Complete) message to the Mobile Switching Center 130 (step 208).

The Mobile Switching Center 130, which has received the assignment completion message, transmits an RMP request (Radio_Measurement_for_Position_Request) message including a PSMM count value to the base station controller 124 (step 210).

When receiving the RMP request message from the Mobile Switching Center 130, the base station controller 124 determines P_Rev (PSMM_Revolve) of the mobile station 110 (step 212). Then, the base station controller 124 transmits a PPMRO (Periodic_Pilot Measurement_Request_Order) message to the mobile station 110 when the P_Rev has a value equal to or greater than 6, and transmits a PMRO (Pilot_Measurement_Request_Order) message to the mobile station 110 when the P_Rev has a value equal to or less than 5.

When the P_Rev has a value equal to or greater than 6, the base station controller 124 transmits a PPMRO message including an order qualifier field (ORDQ) value to the mobile station 110 (step 214). Herein, the ORDQ value represents a transmission period of a PPSMM (Periodic_Pilot_Strength_Measurement_Message), and the transmission period has a unit of 80 ms.

When receiving the PPMRO message, the mobile station 110 periodically transmits the PPSMM to the base station controller 124 according to the ORDQ value (steps 216, 218 and 220). Then, when the PPSMM transmitted from the mobile station 110 satisfies the PSMM count value, the base station controller 124 transmits a PPMRO message having an ORDQ value of "255" to the mobile station 110 so as to stop the periodic transmission of the PPSMM (step 222).

When the P_Rev has a value equal to or less than 5, the base station controller 124 transmits a PMRO message to the mobile station 110 (step 224).

When receiving the PMRO message, the mobile station 110 transmits a PSMM to the base station controller 124, and the base station controller 124 repeatedly transmits a PMRO until a PSMM count value received from the Mobile Switching Center 130 is reached (steps 226, 228, 230, 232 and 234).

When having collected PSMM information, which corresponds to the PSMM count value requested by the Position determination entity 140, from the mobile station 110 through the PPMRO or PMRO message, the base station controller 124 transmits an RMP response (Radio_Measurements_for_Position_Response) message including the collected PSMM information to the Mobile Switching Center 130 (step 236).

The Mobile Switching Center 130 transmits the PSMM information, which has been collected from the mobile station 110 for the purpose of calculating the location of the mobile station 110, to the Position determination entity 140 through an ISPOS request (Inter_System_Position_Request) message (step 238).

When having received the PSMM information of the mobile station 110 from the Mobile Switching Center 130, the Position determination entity 140 detects the location of the mobile station 110 by calculating a sum of the received signal strengths of all multi-path components by means of the collected PSMM information, and then provides a location-based service corresponding to the location of the mobile station 110.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiment disclosed in the present invention has been described not for limiting the scope of the invention, but for describing the invention. Accordingly, the scope of the invention is not to be limited by the above embodiment but by the claims and the equivalents thereof. It will be understood by those skilled in the art that various changes in form and details may be made therein without departing from the spirit and scope of the invention as defined by the appended claims.

INDUSTRIAL APPLICABILITY

According to the present invention as described above, a position detecting service with enhanced accuracy is provided by improving a method for detecting the location of a mobile station not equipped with a GPS function, thereby contributing activation of the location-based service, and providing various benefits such as increased profit.

The invention claimed is:

1. A method for detecting a location of a mobile station (MS) by using a pilot strength measurement message (PSMM) in a mobile communication system comprising a Radio Access Network (RAN) containing a base station transceiver and a base station controller; a Mobile Switching Center (MSC); and a position determination entity (PDE), the method comprising the steps of:
   (a) transmitting, by using the position determination entity, an ISPOS request (Inter_System_Position_Request) message to the Mobile Switching Center;
   (b) transmitting, by using the Mobile Switching Center, an RMP request (Radio_Measurement_for_Position_Request) message to the base station controller;
   (c) receiving, by using the base station controller, the RMP request message from the Mobile Switching Center, and determining P_Rev (Protocol Revision) of the mobile station;
   (d) transmitting a PPMRO (Periodic_Pilot_Measurement_Request_Order) message to the mobile station when the P_Rev has a value equal to or greater than 6 at step (c) and transmitting a PMRO (Pilot_Measurement_Request_Order) message to the mobile station when the P_Rev has a value equal to or less than 5 at step (c);
   (e) using the base station controller and the PPMRO message or the PMRO message to collect the PSMM information from the mobile station;
   (f) transmitting, by using the base station controller, an RMP response (Radio_Measurements_for_Position_Response) message including the PSMM information to the Mobile Switching Center;
   (g) transmitting, by using the Mobile Switching Center, the PSMM information to the position determination entity through an ISPOS request (Inter_System_Position_Request) message; and
   (h) using the position determination entity to detect the location of the mobile station from the collected PSMM information.

2. The method as claimed in claim 1, wherein, at step (a), the ISPOS request message corresponds to a message for requesting the PSMM information of the mobile station, and comprises a PSMM count value.

3. The method as claimed in claim 1, further comprising, after step (a), the steps of:
   (a1) when the mobile station is in an idle state, transmitting, by using the Mobile Switching Center, a paging request (Paging_Request) message to the base station controller so as to establish a traffic channel of the mobile station; and
   (a2) transmitting, by using the base station controller, an assignment completion (Assignment_Complete) message to the Mobile Switching Center after the traffic channel has been established.

4. The method as claimed in claim 1, further comprising, using the Mobile Switching Center to receive between step (a) and step (b), an assignment completion message from the base station controller when the traffic channel of the mobile station has been already established.

5. The method as claimed in claim 1, wherein, at step (b), the RMP request message comprises a PSMM count value.

6. The method as claimed in claim 1, wherein, when the PPMRO message is used, step (e) includes the steps of;
  (e1) transmitting, by using the base station controller, the PPMRO message including an order qualifier field (ORDQ) value to the mobile station;
  (e2) periodically transmitting, by using the mobile station, a PPSMM (Periodic_Pilot_Strength_Measurement_Message to the base station controller according to the ORDQ value; and
  (e3) determining if the PPSMM satisfies the PSMM count value, transmitting the PPMRO having an ORDQ value of "255" to the mobile station when the PPSMM satisfies a PSMM count value so as to stop the periodic transmission of the PPSMM.

7. The method as claimed in claim 6, wherein the ORDQ value corresponds to a transmission period of the PPSMM and the transmission period has a unit of 80 ms.

8. The method as claimed in claim 1, wherein, when the PMRO message is used, step (e) includes the steps of:
  (e4) transmitting, by using the base station controller, the PMRO message to the mobile station; and
  (e5) allowing the mobile station to transmit the PSMM information to the base station controller, and allowing the base station controller to repeatedly transmit the PMRO message until the PSMM count value is reached.

9. The method as claimed in claim 1, wherein, at step (h), the position determination entity detects the location of the mobile station by using a sum of received signal strengths of multi-path components from the PSMM information collected from the mobile station.

* * * * *